United States Patent
Mohamed

(10) Patent No.: US 8,101,702 B2
(45) Date of Patent: Jan. 24, 2012

(54) SILICONE-CONTAINING COMPOSITION

(75) Inventor: Mustafa Mohamed, Midland, MI (US)

(73) Assignee: Dow Corning Corporation, Midland, MI (US)

(*) Notice: Subject to any disclaimer, the term of this patent is extended or adjusted under 35 U.S.C. 154(b) by 343 days.

(21) Appl. No.: 12/522,593

(22) PCT Filed: Jan. 11, 2008

(86) PCT No.: PCT/US2008/000391
§ 371 (c)(1),
(2), (4) Date: Jul. 9, 2009

(87) PCT Pub. No.: WO2008/088733
PCT Pub. Date: Jul. 24, 2008

(65) Prior Publication Data
US 2010/0127219 A1    May 27, 2010

Related U.S. Application Data

(60) Provisional application No. 60/884,626, filed on Jan. 12, 2007, provisional application No. 60/884,628, filed on Jan. 12, 2007.

(51) Int. Cl.
*C08G 77/458* (2006.01)
(52) U.S. Cl. ............... 528/25; 528/28; 528/38; 528/44; 528/59; 528/65; 528/85
(58) Field of Classification Search ............ None
See application file for complete search history.

(56) References Cited

U.S. PATENT DOCUMENTS

| | | | | |
|---|---|---|---|---|
| 4,962,178 A | * | 10/1990 | Harisiades | 528/33 |
| 5,756,572 A | * | 5/1998 | Sweet et al. | 524/448 |
| 6,664,359 B1 | * | 12/2003 | Kangas et al. | 528/38 |
| 6,846,893 B1 | * | 1/2005 | Sherman et al. | 528/28 |

FOREIGN PATENT DOCUMENTS

| | | |
|---|---|---|
| EP | 0250248 A2 | 12/1987 |
| EP | 0679670 A1 | 11/1995 |
| WO | WO 03052021 A1 | 6/2003 |
| WO | WO 2005010076 A2 | 2/2005 |
| WO | WO 2005037891 A1 | 4/2005 |

OTHER PUBLICATIONS

PCT International Search Report for PCT/US2008/000391, dated Jul. 11, 2008, 4 pages.

* cited by examiner

*Primary Examiner* — Marc Zimmer
(74) *Attorney, Agent, or Firm* — Howard & Howard Attorneys PLLC

(57) ABSTRACT

A silicone-containing composition comprises the reaction product of a first component and an excess of an isocyanate component relative to the first component to form an isocyanated intermediary. The first component is selected from one of a polysiloxane and a silicone resin. The first component includes a carbon-bonded functional group selected from one of a hydroxyl group and an amine group. The isocyanate component is reactive with the carbon-bonded functional group of the first component. The isocyanated intermediary includes a plurality of isocyanate functional groups. The silicone-containing composition comprises the further reaction product of a second component, which is selected from the other of the polysiloxane and the silicone resin. The second component includes a plurality of carbon-bonded functional groups reactive with the isocyanate functional groups of the isocyanated intermediary for preparing the silicone-containing composition.

29 Claims, 2 Drawing Sheets

SILICONE-CONTAINING COMPOSITION

RELATED APPLICATIONS

This application claims priority to and all the advantages of International Patent Application No. PCT/US2008/000391, filed on Jan. 11, 2008, which claims priority to U.S. Provisional Patent Application No. 60/884,626 and U.S. Provisional Patent Application No. 60/884,628 both filed on Jan. 12, 2007.

CROSS-REFERENCE TO RELATED APPLICATIONS

This application claims the benefit of U.S. Provisional Patent Application Ser. No. 60/884,626, which was filed on Jan. 12, 2007 and U.S. Provisional Patent Application Ser. No. 60/884,628, which was filed on Jan. 12, 2007 incorporated herewith in its entirety.

GOVERNMENT LICENSE RIGHTS

The U.S. Government has a paid-up license in this invention and the right in limited circumstances to require the patent owner to license others on reasonable terms as provided for by the terms of grant number ZAX-5-33628-02 awarded by National Renewable Energy Laboratory.

FIELD OF THE INVENTION

The present invention relates to a silicone-containing composition and, more specifically, to a silicone-containing composition and to a method of preparing the silicone-containing composition.

DESCRIPTION OF THE RELATED ART

Copolymers are well known to those skilled in the art of polymer science. Copolymers are formed when two or more different types of repeating units, i.e., monomers, are linked in a polymer chain, as opposed to a homopolymer where only one repeating unit is used to form the polymer chain. Since copolymers include at least two types of repeating units, copolymers can be classified based on how the repeating units in the polymer chain are arranged. These classifications of the copolymer include random, alternating, block, graft, star, and brush.

Block copolymers comprise blocks of different polymerized monomers, i.e., chemical blocks. For example, polystyrene-b-poly(methylmethacrylate), also known as PS-b-PMMA, is made by first polymerizing styrene, and then subsequently polymerizing MMA. PS-b-PMMA is a diblock copolymer because it contains two different chemical blocks. Triblock, tetrablock, and pentablock copolymers, including three, four, and five chemical blocks, respectively, may also be made in similar ways. Block copolymers can microphase separate to form periodic nanostructures. In microphase separation, the different chemical blocks move as far away from each other as covalent bonds between them allow to form nano-sized structures. These nano-sized structures can look like, for example, spheres of MMA in a matrix of PS or vice versa, or the structures could be stripes, i.e., lamellae, or cylinders. Block copolymers are useful because the block copolymer tends to include chemical and physical properties of the different chemical blocks.

Block copolymers comprising silicone blocks and at least one of urea and urethane blocks, also known as silicone-organic copolymers or segmented silicone-urea (urethane) copolymers, are well known in the art. These silicone-organic copolymers are typically prepared by reacting polysiloxanes, such as amine functional polydimethylsiloxane, with diisocyanates and at least one of an amine and a polyol. Polysiloxanes have properties well known in the art. These properties include high thermal, UV light, and oxidative stability, low surface energy, hydrophobicity, high gas permeability, increased electrical properties and biocompatibility. However, due to a low glass transition (Tg) temperature of around negative (−) 123° C., polysiloxanes exhibit poor mechanical properties at room temperature. By combining the polysiloxane with the urea and/or the urethane blocks, the silicone-organic copolymer formed therefrom has improved mechanical properties relative to the polysiloxane alone. The silicone blocks are typically classified as soft segments due to an inorganic backbone, and the urea and urethane blocks are typically classified as hard segments due to an organic backbone. In this context, the terminology of soft and hard segments generally relate to rigidity and glass transition temperatures of the segments.

To further take advantage of properties of the silicone-organic copolymers described above, compositions, such as pressure sensitive adhesives, are made by various companies. These compositions typically include the silicone-organic copolymer and a tacktifying resin. The tacktifying resin is typically a silicone resin, such as an MQ resin, which may include silicon-bonded hydrogen, silicon-bonded alkenyl, and silonal groups. However, the tacktifying resin typically remains unreacted with the copolymer, which can lead to creep failure for applications that require mechanical strength.

There remains an opportunity to provide a silicone-containing composition prepared from a polysiloxane, an isocyanate component, and a silicone resin. The polysiloxane and silicone resin include carbon-bonded functional groups reactive with the isocyanate component to prepare the silicone-containing composition. There also remains an opportunity to provide a method of preparing the silicone-containing composition.

SUMMARY OF THE INVENTION AND ADVANTAGES

The present invention provides a silicone-containing composition. The silicone-containing composition comprises the reaction product of a first component and an excess of an isocyanate component relative to the first component to form an isocyanated intermediary. The first component is selected from one of a polysiloxane and a silicone resin. The first component includes a carbon-bonded functional group selected from one of a hydroxyl group and an amine group. The isocyanate component is reactive with the carbon-bonded functional group of the first component. Due to the excess of the isocyanate component, the isocyanated intermediary includes a plurality of isocyanate functional groups. The silicone-containing composition comprises the further reaction product of a second component. The second component is selected from the other of the polysiloxane and the silicone resin. The second component includes a plurality of carbon-bonded functional groups reactive with the isocyanate functional groups of the isocyanated intermediary for preparing the silicone-containing composition.

The present invention further provides a method of preparing the silicone-containing composition. For the method, the first component is provided, and the carbon-bonded functional group of the first component is reacted with the excess of the isocyanate component to form the isocyanated intermediary. The second component is reacted with at least one of the isocyanate functional groups of the isocyanated intermediary to prepare the silicone-containing composition.

The present invention provides a unique combination of the polysiloxane, the isocyanate component, and the silicone resin to prepare the silicone-containing composition. The silicone-containing composition has improved chemical and physical properties due in part to the properties of each of the components. These properties include high thermal, UV light, and oxidative stability, low surface energy, hydrophobicity, high gas permeability, increased electrical properties and biocompatibility. In addition, the present invention also provides a unique method for preparing the silicone-containing composition.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
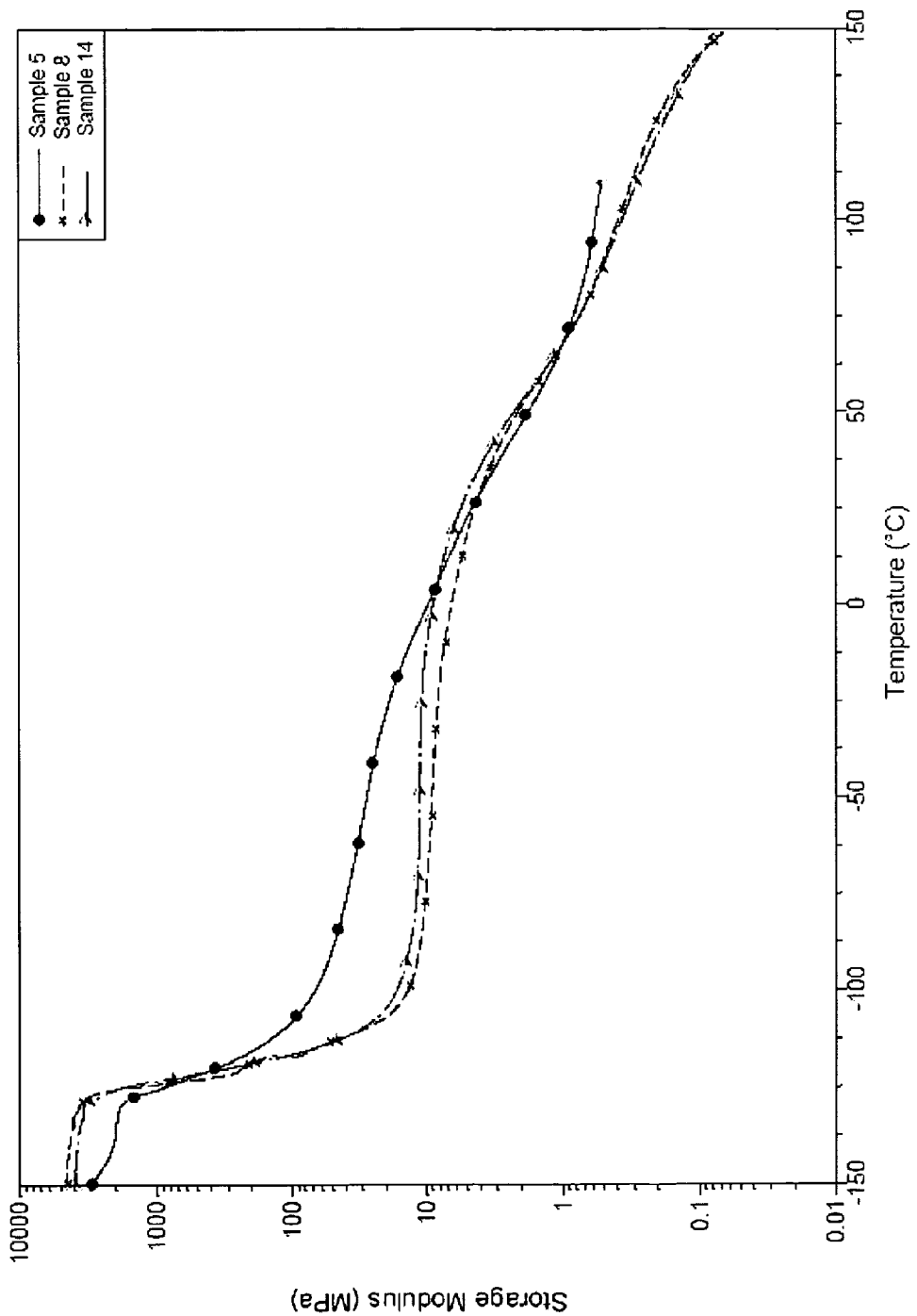
FIG. 1 is a line graph illustrating storage modulus (G') as a function of a change in temperature of examples 5, 8, and 14 of inventive compositions of the present invention.

The present invention provides a silicone-containing composition and a method of preparing the silicone-containing composition, hereinafter, the composition. By "silicone-containing", it is meant that the composition includes repeating silicon-oxygen bonds, i.e., a —Si—O— backbone.

The composition may be used in any industry and may comprise any form. For example, the composition can comprise a film, a coating, a fiber, a liquid, a foam, an elastomer, a pellet, a powder, etc. It is to be appreciated that the composition may be made with specific components and ratios in order to make the composition suitable for various uses. The composition has various properties. These properties include, but are not limited to, high thermal stability, UV light stability, and oxidative stability, low surface energy, hydrophobicity, high gas permeability, increased electrical properties and excellent biocompatibility.

The composition can be used to form an article. If the composition is employed for forming articles, the articles may be formed by any method known in the art. For example, the composition can be molded or extruded to form the article. Examples of articles formed from the composition include a thermoplastic molded part, a thermosetting molded part, a hotmelt adhesive part, a gasket, a seal, an o-ring, a connector, and other articles known in the art.

In one embodiment, the composition is used as an adhesive, e.g. to form an article that is an adhesive layer. For example, the composition may be used as a pressure sensitive adhesive or used to make a tape. The adhesive may include just the composition, or may include additional components, such as, but not limited to, a solvent. The composition may be used for manufacturing components, such as, when the composition is employed as the adhesive. Examples of components made employing the composition as the adhesive include electronic components, photonic components, acoustic dampening components, and other components known in the art.

In another embodiment, the composition is used to treat a preformed article such as, but not limited to, textiles and fibers. In this embodiment, the composition is an article that is a coating or treatment layer. For example, the composition can be used to treat preformed articles such that they are water repellant, i.e., hydrophobic. The composition may cover and protect at least a portion of the preformed article and/or may permeate at least a portion of the preformed article. If the composition is employed for treating preformed articles; the preformed articles can be treated by any method known in the art. For example, the preformed article can be sprayed, dipped, sealed, or coated in the composition. It is to be appreciated that the present invention is not limited to any particular use of the composition. It is also to be appreciated that the composition may be used for forming other articles known in the art that have not been described and exemplified above.

In one embodiment, the composition is not cured. In another embodiment, the composition is cured. By "cured" it is meant that the composition is crosslinked to become rigid. If cured, the composition may be cured by any method known in the art. Specific examples of suitable methods for curing the composition include: room-temperature vulcanization (RTV), free radical curing, radiation and light-induced curing including UV curing, moisture-induced curing, alcoholysis, hydrosilylation curing, and cross linking via organic side chain reactions (if present), etc.

If cured, the composition has a physical transition temperature, i.e., glass transition (Tg) or melting transition, such that the cured composition undergoes changes marked by softening or non-linear reduction in viscosity on reaching certain temperatures under conditions of use. The physical transition temperature may be shifted higher or lower by choosing specific components and amounts of the components employed to form the composition.

The composition comprises the reaction product of a first component and an excess of an isocyanate component relative to the first component. By "excess", it is meant that an entirety of the first component typically reacts with the isocyanate component. However, it is to be appreciated that some amount of the first component and/or some amount of the isocyanate component may remain unreacted. The first component and the isocyanate component react to form an isocyanated intermediary. The first component is selected from one of a polysiloxane and a silicone resin. In a first embodiment, the first component is the polysiloxane. In a second embodiment, the first component is the silicone resin. The first and second embodiments are described in further detail below.

The first component includes a carbon-bonded functional group. The carbon-bonded functional group is selected from one of a hydroxyl group and an amine group. The carbon-bonded functional group of the first component is typically a terminal group. However, the carbon-bonded functional group may be a non-terminal group, such as, but not limited to, a pendant group. In other embodiments, the first component may includes a plurality of carbon-bonded functional groups including at least one of the hydroxyl group and the amine group. In these embodiments, at least one of the carbon-bonded functional groups may be selected from other functional groups known in the art such as, but not limited to, an alkoxy group or a hydride group. Further, each one of the plurality of the carbon-bonded functional group may be the same as or different than each other. For example, the first component may include a carbon-bonded hydroxyl group and a carbon-bonded amine group, two carbon-bonded hydroxyl groups, two carbon-bonded amine groups, etc. It is to be appreciated that if the first component includes the plurality of the carbon-bonded functional group, various combinations of the carbon-bonded functional groups are possible. In other embodiments, the first component further includes at least one of a non-carbon-bonded functional group, which can be any functional group known in the art. For example, the non-carbon-bonded functional group of the first component can be a silicon-bonded hydroxyl group or a silicon-bonded amine group.

The first component may be present in the composition in any amount. In the first embodiment, wherein the first component is the polysiloxane, the first component is typically present in an amount of from 5.0 to 98, more typically from 25 to 95, most typically from 50 to 95, parts by weight, based on 100 parts by weight of the composition. In the second embodiment, wherein the first component is the silicone resin, the first component is typically present in an amount of from 5.0 to 70, more typically from 10 to 40, most typically from 20 to 30, parts by weight, based on 100 parts by weight of the composition.

The isocyanate component is reactive with the carbon-bonded functional group of the first component. It is to be appreciated that the isocyanate component may also be reactive with other functional groups of the first component, including carbon-bonded and/or non-carbon bonded functional groups, if present. The isocyanate component may be any isocyanate component known in the art. Examples of suitable isocyanate components for forming the composition include organic polyisocyanates, which may have two or more isocyanate functionalities, and include conventional aliphatic, cycloaliphatic, araliphatic and aromatic isocyanates. The isocyanate component may be selected from the group of diphenylmethane diisocyanates (MDI), polymeric diphenylmethane diisocyanates (pMDI), toluene diisocyanates (TDI), hexamethylene diisocyanates (HDI), dicyclohexylmethane diisocyanates (HMDI), isophorone diisocyanates (IPDI), cyclohexyl diisocyanates (CHDI), and combinations thereof. In one embodiment, the isocyanate component is of the formula OCN—R—NCO, wherein R is selected from one of an alkyl moiety, an aryl moiety, and an arylalkyl moiety. In this embodiment, the isocyanate component can include any number of carbon atoms, typically from 4 to 20 carbon atoms.

Specific examples of suitable isocyanate components include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane, 2,4- and 2,6-hexahydrotoluene diisocyanate as well as the corresponding isomeric mixtures, 4,4'- 2,2'-, and 2,4'-dicyclohexylmethane diisocyanate as well as the corresponding isomeric mixtures, and aromatic diisocyanates and polyisocyanates such as 2,4- and 2,6-toluene diisocyanate and the corresponding isomeric mixtures, 4,4'-, 2,4'-, and 2,2'-diphenylmethane diisocyanate and the corresponding isomeric mixtures, mixtures of 4,4'-, 2,4'-, and 2,2-diphenylmethane diisocyanates and polyphenylenepolymethylene polyisocyanates, as well as mixtures of MDI and toluene diisocyanates.

The isocyanate component may include modified multivalent isocyanates, i.e., products obtained by the partial chemical reaction of organic diisocyanates and/or polyisocyanates. Examples of suitable modified multivalent isocyanates include diisocyanates and/or polyisocyanates containing ester groups, urea groups, biuret groups, allophanate groups, carbodiimide groups, isocyanurate groups, and/or urethane groups. Specific examples of suitable modified multivalent isocyanates include organic polyisocyanates containing urethane groups and having an NCO content of 15 to 33.6 parts by weight based on the total weight, e.g. with low molecular weight diols, triols, dialkylene glycols, trialkylene glycols, or polyoxyalkylene glycols with a molecular weight of up to 6000; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of from 3.5 to 29 parts by weight based on the total weight of the isocyanate and produced from the polyester polyols and/or polyether polyols; 4,4'-diphenylmethane diisocyanate, mixtures of 2,4'- and 4,4'-diphenylmethane diisocyanate, 2,4- and/or 2,6-toluene diisocyanates or polymeric MDI are also suitable. Furthermore, liquid polyisocyanates containing carbodiimide groups having an NCO content of from 15 to 33.6 parts by weight based on the total weight of the isocyanate component, may also be suitable, e.g. based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

In one embodiment, the isocyanate component is a diisocyanate. As known to those of ordinary skill in the art, diisocyanates include two isocyanate functional groups, i.e., two NCO groups. In this embodiment, one of the two isocyanate functional groups reacts with the carbon-bonded functional group, i.e., the hydroxyl group or amine group, of the first component to form the isocyanated intermediary. The other of the two isocyanate functional groups typically remains unreacted with the first component. Alternatively, the other of the two isocyanate functional groups may react with the carbon-bonded functional group of another molecule of the first component.

In another embodiment, the isocyanate component is a polyisocyanate. As known to those of ordinary skill in the art, polyisocyanates include three or more isocyanate functional groups. In this embodiment, one of the isocyanate functional groups reacts with the carbon-bonded functional group, i.e., the hydroxyl group or amine group, of the first component. The remaining isocyanate groups typically remain unreacted with the first component. Alternatively, one or more of the remaining isocyanate groups may react with one or more other molecules of the first component.

In other embodiments, the isocyanate component can include a combination of one or more diisocyanates and one or more polyisocyanates. The isocyanated intermediary includes a plurality of the isocyanate functional groups. It is to be appreciated that the number of the isocyanate functional groups depends on the first component and/or the isocyanate component employed to form the isocyanated intermediary. Further, an amount of the components, respectively, also affects the number of the isocyanate functional groups of the isocyanated intermediary.

If the isocyanate component is the diisocyanate, the isocyanate component functions as a chain extension agent reacting with and extending from the first component to form the isocyanated intermediary. If the isocyanate component is the polyisocyanate, the isocyanate component functions as a branching agent reacting with and extending from the first component to form the isocyanated intermediary. It is to be appreciated that various amounts and combinations of one or more of the diisocyanates and one or more of the polyisocyanates may be utilized as the isocyanate component to introduce various combinations of chain extension and/or branching for forming the isocyanated intermediary.

The isocyanate component may be present in the composition in any amount. Typically, the isocyanate component is present in an amount of from 1.0 to 50, more typically from 1.0 to 10, most typically from 3.5 to 7.5, parts by weight, based on 100 parts by weight of the composition.

If the carbon-bonded functional group of the first component is the hydroxyl group, one of the isocyanate groups of the isocyanate component reacts with the hydroxyl group to form a urethane linkage while forming the isocyanated intermediary. If the carbon-bonded functional group of the first component is the amine group, one of the isocyanate groups of the isocyanate component reacts with the amine group to form a urea linkage while forming the isocyanated intermediary. The isocyanated intermediary may include a plurality of the urethane linkages and/or a plurality of the urea linkages. In other words, it is to be appreciated that the isocyanated intermediary can include various combinations of the urethane and/or urea linkages.

One example of forming the isocyanated intermediary is illustrated below by the simplified Reaction Scheme (I).

Reaction Scheme (I):

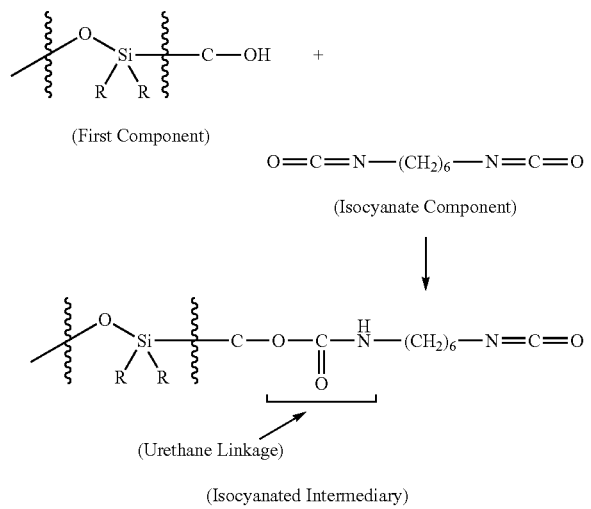

In Reaction Scheme (I) above, the first component includes the hydroxyl group as the carbon-bonded functional group. The isocyanate component is the diisocyanate, more specifically, the isocyanate component is HDI. The hydroxyl group reacts with one of the isocyanate groups of the isocyanate component to form the isocyanated intermediary. The isocyanated intermediary includes the urethane linkage formed by the reaction between the first component and the isocyanate component. Each of the R groups may be, for example, a hydrogen atom or an organic group. In addition, the carbon-bonded functional group of the first component may include at least one additional group (not shown) in addition to the hydroxyl group.

Another example of forming the isocyanated intermediary is illustrated below by the simplified Reaction Scheme (II).

Reaction Scheme (II):

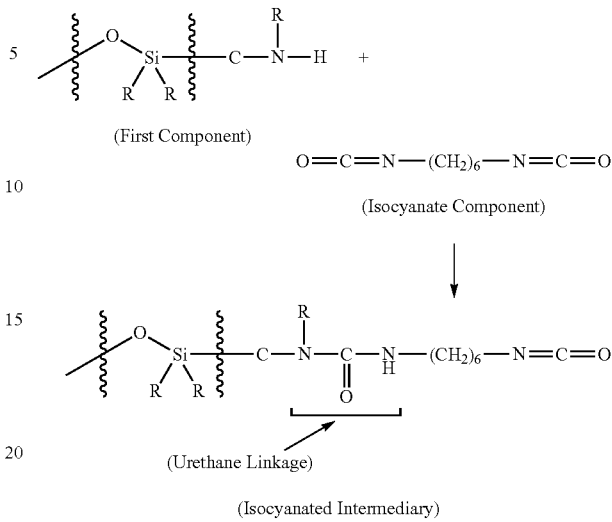

In Reaction Scheme (II) above, the first component includes the amine group as the carbon-bonded functional group. The isocyanate component is HDI. The amine group reacts with one of the isocyanate groups of the isocyanate component to form the isocyanated intermediary. The isocyanated intermediary includes the urea linkage formed by the reaction between the first component and the isocyanate component. Each of the R groups may be, for example, a hydrogen atom or an organic group. In addition, the carbon-bonded functional group of the first component may include at least one additional group (not shown) in addition to the amine group.

Yet another example of forming the isocyanated intermediary is illustrated below by the simplified Reaction Scheme (III).

Reaction Scheme (III):

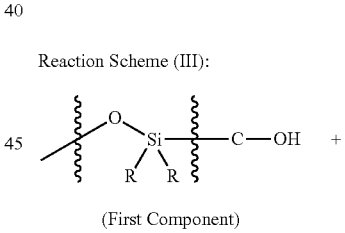

(First Component)

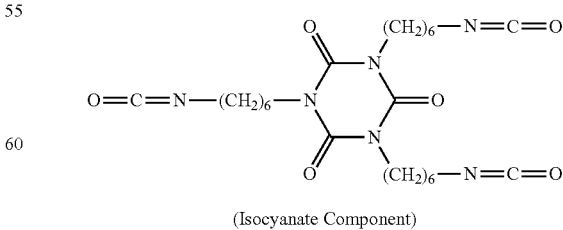

(Isocyanate Component)

-continued

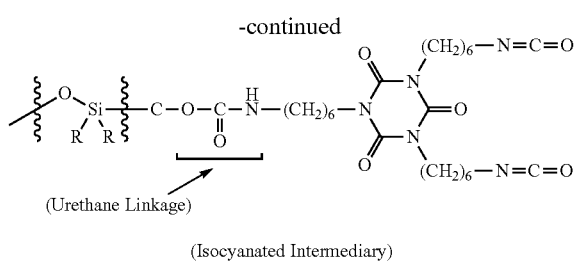

(Urethane Linkage)

(Isocyanated Intermediary)

In Reaction Scheme (III) above, the first component includes the hydroxyl group as the carbon-bonded functional group. The isocyanate component is the polyisocyanate, more specifically, the isocyanate component is HDI isocyanurate. The hydroxyl group reacts with one of the isocyanate groups of the isocyanate component to form the isocyanated intermediary. The isocyanated intermediary includes the urethane linkage formed by the reaction between the first component and the isocyanate component. Each of the R groups may be, for example, a hydrogen atom or an organic group. In addition, the carbon-bonded functional group of the first component may include at least one additional group (not shown) in addition to the hydroxyl group. In another reaction scheme (not shown), the first component may include the amine group rather than the hydroxyl group, such that the isocyanated intermediary of Reaction Scheme (III) would include the urea linkage rather than the urethane linkage.

Referring back to the composition, the composition comprises the further reaction product of a second component. The second component is selected from the other of the polysiloxane and the silicone resin. In other words, and as alluded to above, in the first embodiment, if the first component is the polysiloxane, the second component is the silicone resin. Conversely, in the second embodiment, if the first component is the silicone resin, the second component is the polysiloxane. By choosing either the polysiloxane or the silicone resin for either of the first and second components, respectively, and by choosing various amounts of each of the components relative to each other, end properties of the composition can be changed. For example, selection of the components is useful for tuning a desired combination of bulk and surface properties of the composition such as, but not limited to, cure rate, modulus, surface energy, thermal stability, moisture resistance, hydrophobic balance, and adhesion. It is to be appreciated that some of the aforementioned properties may be applicable prior to or after the composition cures, if the composition is cured. The polysiloxane and the silicone resin are described in further detail below.

The second component includes a plurality of carbon-bonded functional groups. The carbon-bonded functional groups of the second component are reactive with the isocyanate functional groups of the isocyanated intermediary thereby forming the composition. The carbon-bonded functional groups of the second component may be the same as or different than the carbon-bonded functional group of the first component. The carbon-bonded functional groups of the second component are typically terminal groups. However, the carbon-bonded functional groups may be non-terminal groups, such as, but not limited to, pendant groups. It is to be appreciated that the second component may include a combination of terminal and pendant groups. Typically, the carbon-bonded functional groups of the second component are selected from the group of hydroxyl groups, amine groups, and combinations thereof. However, the carbon-bonded functional groups may be selected from other functional groups known in the art such as, but not limited to, an alkoxy group or a hydride group. Each of the carbon-bonded functional groups of the second component may be the same as or different than each other. For example, the second component may include a carbon-bonded hydroxyl group and a carbon-bonded amine group, two carbon-bonded hydroxyl groups, two carbon-bonded amine groups, etc. It is to be appreciated that various combinations of the carbon-bonded functional groups are possible. In other embodiments, the second component includes at least one non-carbon-bonded functional group, which may be any functional group known in the art. For example, the non-carbon-bonded functional group of the second component can be a silicon-bonded hydroxyl group or a silicon-bonded amine group.

The second component may be present in the composition in any amount. In the first embodiment, wherein the second component is the silicone resin, the second component is typically present in an amount of from 5.0 to 50, more typically from 10 to 40, most typically from 20 to 30, parts by weight, based on 100 parts by weight of the composition. In the second embodiment, wherein the second component is the polysiloxane, the second component is typically present in an amount of from 5.0 to 98, more typically from 25 to 95, most typically from 50 to 95, parts by weight, based on 100 parts by weight of the composition.

If one of the carbon-bonded functional groups of the second component is the hydroxyl group, one of the isocyanate groups of the isocyanated intermediary reacts with the hydroxyl group to form a urethane linkage. If one of the carbon-bonded functional groups of the second component is the amine group, one of the isocyanate groups of the isocyanated intermediary reacts with the amine group to form a urea linkage. In one embodiment, the composition includes a plurality of the urethane linkages. In another embodiment, the composition includes a plurality of the urea linkages. In other embodiments, the composition includes various combinations of one or more urethane linkages and one or more urea linkages. In one embodiment, the composition is a linear silicone-organic copolymer. In another embodiment, the composition is a branched silicone-organic copolymer. In these embodiments, the composition can be classified as one of a silicone-urea copolymer, a silicone-urethane copolymer, and a silicone-urea/urethane copolymer.

One example of forming the composition is illustrated below by the simplified Reaction Scheme (IV).

Reaction Scheme (IV):

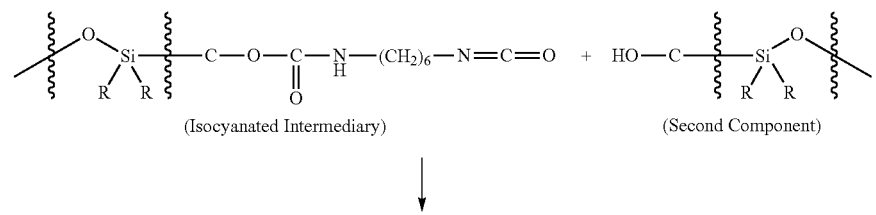

(Isocyanated Intermediary)      (Second Component)

-continued

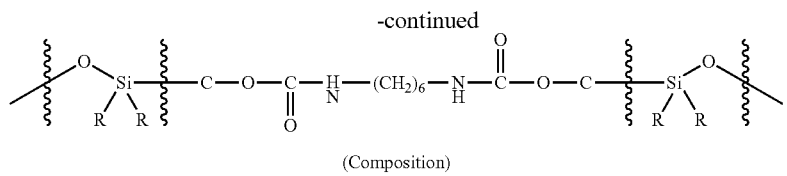

(Composition)

In Reaction Scheme (IV) above, the second component includes the hydroxyl group as one of the carbon-bonded functional groups. The isocyanated intermediary is the isocyanated intermediary of Reaction Scheme (I) above. The hydroxyl group reacts with the isocyanate group of the isocyanated intermediary to form the composition. The composition includes a second urethane linkage formed by the reaction between the second component and the isocyanated intermediary. Each of the R groups may be, for example, a hydrogen atom or an organic group. In addition, the carbon-bonded functional group of the second component may include at least one additional group (not shown) in addition to the hydroxyl group.

Another example of forming the composition is illustrated below by the simplified Reaction Scheme (V).

Reaction Scheme (V):

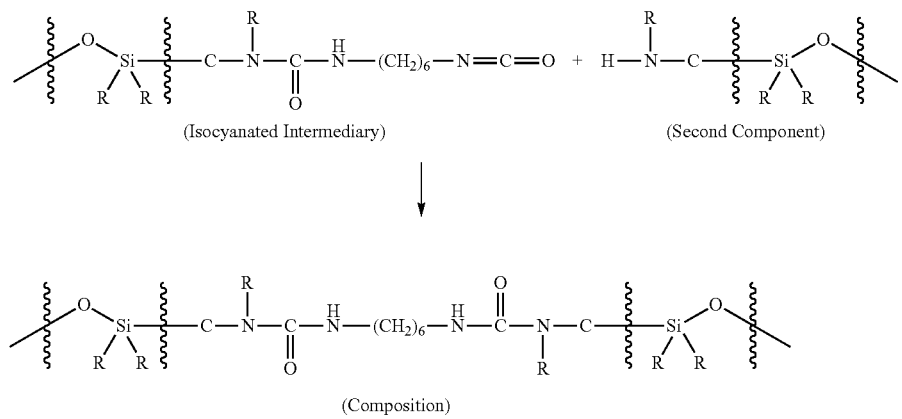

In Reaction Scheme (V) above, the second component includes the amine group as one of the carbon-bonded functional groups. The isocyanated intermediary is the isocyanated intermediary of Reaction Scheme (II) above. The amine group reacts with the isocyanate group of the isocyanated intermediary to form the composition. The composition includes a second urea linkage formed by the reaction between the second component and the isocyanated intermediary. Each of the R groups may be, for example, a hydrogen atom or an organic group. In addition, the carbon-bonded functional group of the second component may include at least one additional group (not shown) in addition to the amine group.

Yet another example of forming the composition is illustrated below by the simplified Reaction Scheme (VI).

Reaction Scheme (VI):

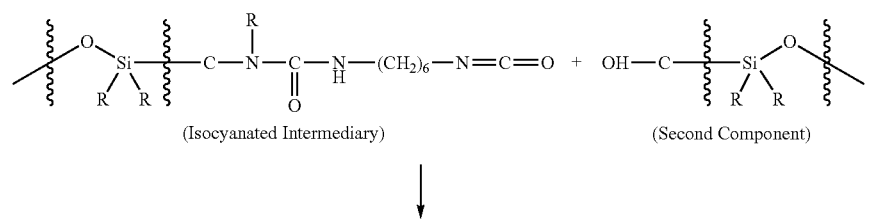

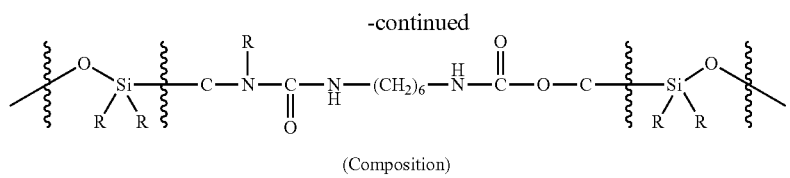

(Composition)

In Reaction Scheme (VI) above, the second component includes the hydroxyl group as one of the carbon-bonded functional groups. The isocyanated intermediary is the isocyanated intermediary of Reaction Scheme (II) above. The amine group reacts with the isocyanate group of the isocyanated intermediary to form the composition. The composition includes the urethane linkage formed by the reaction between the second component and the isocyanated intermediary. Each of the R groups may be, for example, a hydrogen atom or an organic group. In addition, the carbon-bonded functional group of the second component may include at least one additional group (not shown) besides the hydroxyl group.

Yet another example of forming the composition is illustrated below by the simplified Reaction Scheme (VII)

In another reaction scheme (not shown), similar to Reaction Scheme (VII) above, the second component includes the amine group rather than the hydroxyl group, such that the composition of Reaction Scheme (VII) would include at least one of the urea linkages rather than an entirety of the urethane linkages.

In one embodiment, at least one of the isocyanate groups of the isocyanated intermediary remains unreacted. This can occur by controlling an amount of the second component relative to the isocyanated intermediary such that the isocyanated intermediary is in excess relative to the second component. In addition or alternative to, at least one of the carbon-bonded functional groups of the first component and/or the second component can remain unreacted. In other words, the Reaction Scheme (VII):

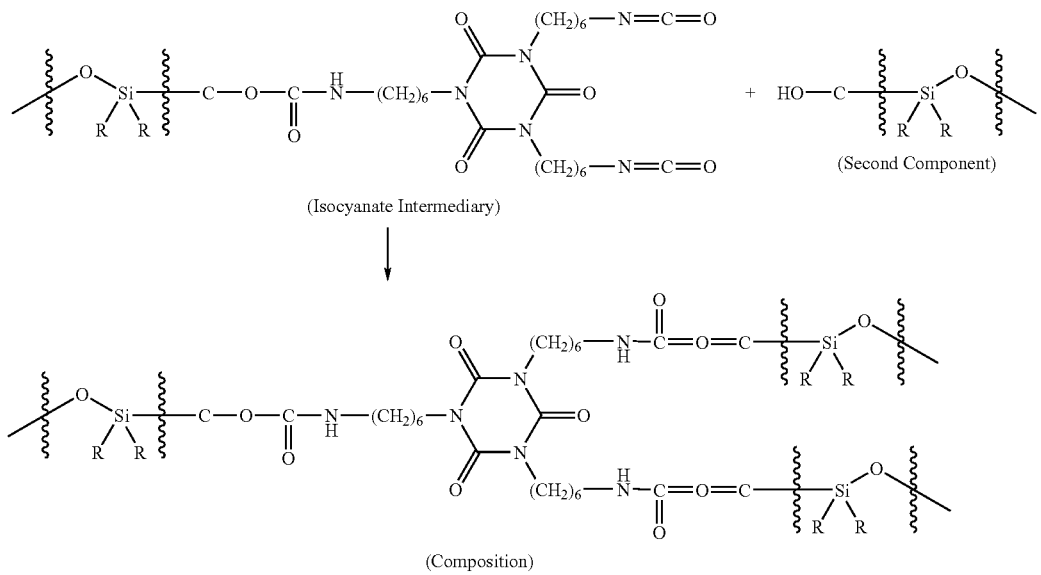

In Reaction Scheme (VII) above, the second component includes the hydroxyl group as one of the carbon-bonded functional groups. The isocyanated intermediary is the isocyanated intermediary of Reaction Scheme (III) above. The hydroxyl group reacts with one of the isocyanate groups of the isocyanated intermediary to form the composition. The composition includes the urethane linkages formed by the reaction between the second component and the isocyanated intermediary. Each of the R groups may be, for example, a hydrogen atom or an organic group. In addition, the carbon-bonded functional group of the second component may include at least one additional group (not shown) in addition to the hydroxyl group. It is to be appreciated that the urethane linkages can be formed by one of the second component that includes at least two of the carbon-bonded functional groups, or can be formed by two of the second components, each including at least one of the carbon-bonded functional groups.

composition can include one or more unreacted carbon-bonded functional groups. The composition can also include one or more unreacted non-carbon-bonded functional groups, if present. The unreacted functional groups of the composition, if present, may then be further reacted or left unreacted.

Referring now to the polysiloxane, the polysiloxane may be any polysiloxane known in the art. The polysiloxane typically includes the general structure:

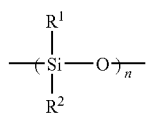

wherein each of the $R^1$ and $R^2$ moieties can be any moiety known in the art, and wherein subscript n may be any integer.

It is to be appreciated that each of the $R^1$ and $R^2$ moieties may be the same as or different than each other.

Specific examples of suitable $R^1$ and $R^2$ moieties include functional and non-functional groups such as, but not limited to, hydrogen atoms, alkyl groups, alkylenyl groups, aryl groups, alkaryl groups, alkoxy groups, halogen substituted groups including halogen substituted alkyl and aryl groups, acyloxy groups, ketoximate groups, mercapto groups, alkenyloxy groups, and combinations thereof.

The polysiloxane may also include hydrocarbylene and/or fluorocarbylene groups as, or in addition to, the $R^1$ and $R^2$ moieties. Hydrocarbylene groups include a divalent moiety including a carbon atom and a hydrogen atom. Fluorocarbylene groups include a hydrocarbylene moiety with at least one of the hydrogen atoms replaced with at least one fluorine atom. Preferred fluorocarbylene groups include partially or wholly fluorine substituted alkylene groups. The polysiloxane may also include olefinic moieties including, but not limited to, acrylate, methacrylate, vinyl, acetylenyl, and combinations thereof.

The polysiloxane is typically a polydiorganosiloxane. In one embodiment, the polysiloxane is a polydimethylsiloxane. In this embodiment, the polysiloxane is typically terminated by the carbon-bonded functional groups. However, the polysiloxane may include pendant carbon-bonded functional groups in addition to or alternative to the terminal carbon-bonded functional groups. Examples of suitable aminofunctional hydrocarbon groups of the polysiloxane include —CH$_2$CH$_2$NH$_2$, —CH$_2$CH$_2$CH$_2$NH$_2$, —CH$_2$CHMeNH$_2$, —CH$_2$CH$_2$CH$_2$CH$_2$NH$_2$, —CH$_2$CH$_2$CH$_2$CH$_2$CH$_2$NH$_2$, —CH$_2$CH$_2$CH$_2$CH$_2$CH$_2$NH$_2$, —CH$_2$CH$_2$NHMe, CH$_2$CH$_2$CH$_2$NHMe, —CH$_2$CHMeCH$_2$NHMe, —CH$_2$CH$_2$CH$_2$CH$_2$NHMe, —CH$_2$CH$_2$NHCH$_2$CH$_2$NH$_2$, —CH$_2$CH$_2$CH$_2$NHCH$_2$CH$_2$NH$_2$, —CH$_2$CH$_2$CH$_2$CH$_2$NHCH$_2$CH$_2$CH$_2$NH$_2$, —CH$_2$CH$_2$NHCH$_2$CH$_2$NHMe, —CH$_2$CH$_2$CH$_2$NHCH$_2$CH$_2$NHMe, —CH$_2$CH$_2$CH$_2$CH$_2$NHCH$_2$CH$_2$CH$_2$NHMe, and —CH$_2$CH$_2$NHCH$_2$CH$_2$NHCH$_2$CH$_2$Me, wherein Me is a methyl group.

The polysiloxane may be of any molecular weight. Typically, the polysiloxane has a molecular weight of from 100 to 200,000, more typically from 1,000 to 50,000, most typically from 1,000 to 10,000.

Referring now to the silicone resin, the silicone resin may be any silicone resin known in the art. The silicone resin typically includes one or more of the following:

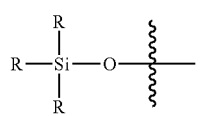
(M)

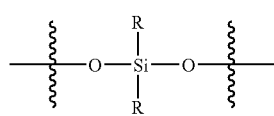
(D)

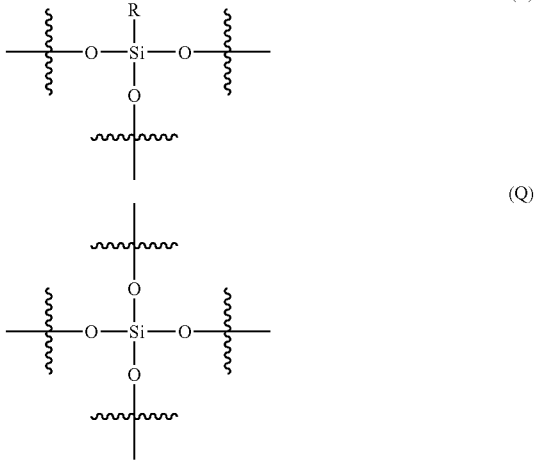

wherein each of M, D, T, and Q independently represent a structural unit of the silicone resin. Specifically, the M structural unit represents a monofunctional group $R_3SiO_{1/2}$. The D structural unit represents a difunctional group $R_2SiO_{2/2}$. The T structural unit represents a trifunctional group $RSiO_{3/2}$. The Q structural unit represents a tetrafunctional group $SiO_{4/2}$.

The silicone resin may include any one of or combination of the M, D, T, and Q structural units. For example, the silicone resin can include MD resins including $R^3_3SiO_{1/2}$ groups and $R^3_2SiO_{2/2}$ groups, MT resins including $R^3_3SiO_{1/2}$ groups and $R^3SiO_{3/2}$ groups, MQ resins including $R^3_3SiO_{1/2}$ groups and $SiO_{4/2}$ groups, TD resins including $R^3SiO_{3/2}$ groups and $R^3_2SiO_{2/2}$ groups, MTD resins including $R^3_3SiO_{1/2}$ groups, $R^3SiO_{3/2}$ groups, and $R^3_2SiO_{2/2}$ groups, and combinations thereof.

The $R^3$ moiety may be any moiety known in the art. Each of the $R^3$ moieties may be the same as or different than each other. The $R^3$ moieties may be functional, nonfunctional, or combinations thereof. For example, the $R^3$ moieties can be amine functional hydrocarbon groups and/or hydroxyl functional hydrocarbon groups. Typically, each of the $R^3$ moieties includes a monovalent organic group. The $R^3$ moiety typically has 1 to 20, more typically has 1 to 10, carbon atoms. Suitable examples of the monovalent organic groups include, but are not limited to, acrylate functional groups such as acryloxyalkyl groups, methacrylate functional groups such as methacryloxyalkyl groups, cyanofunctional groups, and monovalent hydrocarbon groups, and combinations thereof. The monovalent hydrocarbon groups may include alkyl groups such as methyl, ethyl, propyl, pentyl, octyl, undecyl, and octadecyl groups; cycloalkyl groups such as cyclohexyl groups; alkenyl groups such as vinyl, allyl, butenyl, and hexenyl groups; alkynyl groups such as ethynyl, propynyl, and butynyl groups; aryl groups such as phenyl, tolyl, xylyl, benzyl, and 2-phenylethyl groups; halogenated hydrocarbon groups such as 3,3,3-trifluoropropyl, 3-chloropropyl, dichlorophenyl, and 6,6,6,5,5,4,4,3,3-nonafluorohexyl groups; and combinations thereof. The cyano-functional groups may include cyanoalkyl groups such as cyanoethyl and cyanopropyl groups, and combinations thereof.

Examples of suitable aminofunctional hydrocarbon groups of the silicone resin include —CH$_2$CH$_2$NH$_2$, —CH$_2$CH$_2$CH$_2$NH$_2$, —CH$_2$CHMeNH$_2$, —CH$_2$CH$_2$CH$_2$CH$_2$NH$_2$, —CH$_2$CH$_2$CH$_2$CH$_2$NH$_2$, —CH$_2$CH$_2$CH$_2$CH$_2$CH$_2$NH$_2$, —CH$_2$CH$_2$NHMe, —CH$_2$CH$_2$CH$_2$NHMe, —CH$_2$CHMeCH$_2$NHMe, —CH₂CH₂CH₂CH₂NHMe, —CH₂CH₂NHCH₂CH₂NH₂,
—CH₂CH₂CH₂NHCH₂CH₂CH₂NH₂,
—CH₂CH₂CH₂CH₂NHCH₂CH₂CH₂CH₂NH₂,
—CH₂CH₂NHCH₂CH₂NHMe,
—CH₂CH₂CH₂NHCH₂CH₂CH₂NHMe,
—CH₂CH₂CH₂CH₂NHCH₂CH₂CH₂CH₂NHMe, and
—CH₂CH₂NHCH₂CH₂NHCH₂CH₂Me.

The silicone resin is typically of the general formula:

$$(M)_a(D)_b(T)_c(Q)_d$$

wherein subscript a is from 0 to 0.6, subscript b is from 0.1 to 0.9, subscript c is from 0.1 to 0.8, and subscript d is from 0 to 0.5, and the M, D, T, and Q structural units are the same as described and exemplified above. In another embodiment, subscript a is from 0 to 0.2, subscript b is from 0.1 to 0.8, subscript c is from 0.1 to 0.4, and subscript d is from 0 to 0.2.

In one embodiment, the silicone resin includes at least one of an alkyl group, an aryl group, an alkenyl group, and an alkynyl group. It is to be appreciated that the silicone resin may include various combinations of the groups. For example, in one embodiment, the silicone resin comprises at least one of the D structural units including an aryl group and an alkyl group, at least another of the D structural units including at least one of an amine group, and at least one of the T structural units including an aryl group.

In one embodiment, the silicone resin is of the general formula:

$$M_{0.075}D^{PhMe}{}_{0.525}D^{NH_2}{}_{0.10}T^{Ph}{}_{0.30}$$

wherein a portion of the D structural units includes phenyl (Ph) and methyl (Me) groups as the $R^3$ moieties, the remaining D structural units include the carbon-bonded functional group, more specifically, the amine group, as one of the $R^3$ moieties, and the T structural units include phenyl groups as the $R^3$ moiety.

In another embodiment, the silicone resin is of the general formula:

$$D^{PhMe}{}_{0.60}D^{NH_2}{}_{0.10}T^{Ph}{}_{0.30}$$

wherein a portion of the D structural units includes phenyl and methyl groups as the $R^3$ moieties, the remaining D structural units include the carbon-bonded functional group, more specifically, the amine group, as one of the $R^3$ moieties, and the T structural units include phenyl groups as the $R^3$ moiety.

Some specific examples of suitable silicone resins for forming the composition include: $M^{Methacryloxymethyl}Q$ resins, $M^{Methacryloxypropyl}Q$ resins, $MT^{Methacryloxymethyl}T$ resins, $MT^{Methacryloxypropyl}T$ resins, $MDT^{Methacryloxymethyl}T^{Phenyl}T$ resins, $MDT^{Methacryloxypropyl}T^{Phenyl}T$ resins, $M^{Vinyl}T^{Phenyl}$ resins, $TT^{Methacryloxymethyl}$ resins, $TT^{Methacryloxypropyl}$ resins, $T^{Phenyl}T^{Methacryloxymethyl}$ resins, $T^{Phenyl}T^{Methacryloxypropyl}$ resins, $TT^{Phenyl}T^{Methacryloxymethyl}$ resins, $D^{PhenylMethyl}D^{Amine}T^{Phenyl}$ resins $MD^{PhenylMethyl}D^{Amino}T^{Phenyl}$ resins and $TT^{Phenyl}T^{Methacryloxypropyl}$ resins, and combinations thereof, wherein the M, D, T, and Q structural units are the same as described and exemplified above. It is to be appreciated that the composition may include any number and/or combination of the silicone resins described and exemplified herein.

In one embodiment, the silicone resin is a carbinol-functional silicone resin, which is incorporated herein and described in PCT publication WO2005/037891 to Horstman et al. In another embodiment, the silicone resin is an amino-functional silicone resin, which is incorporated herein and described in PCT publication WO2005/010076 to Gordon et al.

The silicone resin may be prepared by any method known in the art. For example, the silicone resin may be made by a hydrolysis and condensation reaction of di- and triorganosilanes. It is to be appreciated that the present invention is not limited to any particular method of preparing the silicone resin.

In one embodiment, the composition includes the further reaction product of a chain extender. The chain extender typically includes two functional groups; however, the chain extender may include three or more functional groups, such that the chain extender functions as a branching agent. The functional groups may be the same as or different than each other. Further, the functional groups may be the same as or different than the functional groups of the first component and/or the second component.

If employed to prepare the composition, the chain extender may be any chain extender known in the art. For example, the chain extender can be selected from the group of polyols including diols and triols, polyamines including diamines and triamines, and combinations thereof. In one embodiment, the chain extender is reacted with the isocyanated intermediary prior to the second component and the isocyanated intermediary partially reacting, i.e., prior to forming the composition. In another embodiment, the chain extender is reacted with at least some of the isocyanate component, i.e., excess of the isocyanate component, prior to reacting the isocyanate component and the first component. If employing the chain extender to form the composition, by choosing an amount of the chain extender, and where to employ the chain extender, end properties of the composition can be changed.

Specific examples of suitable chain extenders include: 1,6-diaminohexane, 1,4-butanediol, ethylene glycol, diethylene glycol, propylene glycol, dipropylene glycol, 1,4-cyclohexanedimethanol, hydroquinone dihydroxyethyl ether (HQEE), ethanolamine, N-phenyldiethanolamine, bisphenol A bis(hydroxyethylether), m-phenylenediamine, diethyl toluene diamine (DETDA), ethylene diamine, polytetramethylene oxide (PTMO), glycerol, trimethylolpropane, diethanolamine, triethanolamine, 1,2,4-butantriol, and combinations thereof.

If employed to prepare the composition, the chain extender may be present in the composition in any amount. Typically, the chain extender is present in an amount of from 0.1 to 30, more typically from 1 to 20, most typically from 1 to 5, parts by weight, based on 100 parts by weight of the composition.

If the chain extender is employed to prepare the composition and includes a hydroxyl group, one of the isocyanate groups of the isocyanated intermediary reacts with the hydroxyl group to form an additional urethane linkage. If the chain extender is employed to prepare the composition and includes an amine group, one of the isocyanate groups of the isocyanated intermediary reacts with the amine group to form an additional urea linkage. It is to be appreciated that the chain extender may include a combination of one or more of the hydroxyl groups and one or more of the amine groups. As previously described, the composition may include the plurality of the urethane linkages and/or the plurality of the urea linkages. If already present, the excess of the isocyanate component may further react with the chain extender attached to the isocyanated intermediary. It is to be appreciated that if employed to form the composition, the chain extender becomes integral with the isocyanated intermediary. The isocyanated intermediary with chain extension via one or more of the chain extender may then further react with the second component to form the composition.

An example of forming the isocyanated intermediary with chain extension is illustrated below by the simplified Reaction Scheme (VIII).

Reaction Scheme (VIII):

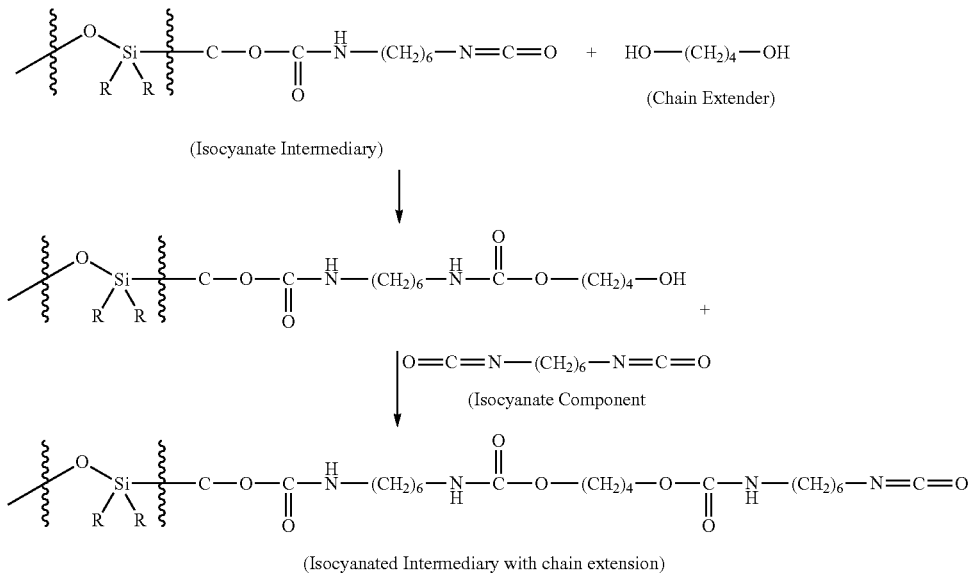

(Isocyanated Intermediary with chain extension)

In Reaction Scheme (VIII) above, the chain extender is a diol, more specifically, the chain extender is 1,4-butanediol. The isocyanated intermediary is the isocyanated intermediary of Reaction Scheme (I) above. One of the hydroxyl groups of the chain extender reacts with one of the isocyanate groups of the isocyanated intermediary. The isocyanate component reacts with the other hydroxyl groups of the chain extender (the chain extender now integral with the isocyanated intermediary of Reaction Scheme (I)) to form the isocyanated intermediary with chain extension. Each of the R groups may be, for example, a hydrogen atom or an organic group. The isocyanated intermediary with chain extension may then be further reacted with another chain extender and another isocyanate component to further chain extend the isocyanated intermediary. Alternatively, the isocyanated intermediary with chain extension may then be further reacted with the second component to form the composition.

In another reaction scheme (not shown) similar to Reaction Scheme (VIII) above, after the isocyanated intermediary and the chain extender react, another isocyanated intermediary reacts with the other hydroxyl groups of the chain extender (the chain extender now integral with the isocyanated intermediary) rather than the isocyanate component. In other words, the chain extender may cross-link two or more molecules of the isocyanated intermediaries to form a larger isocyanated intermediary.

The composition typically includes a plurality of hard segments. The hard segments comprise organic segments selected from the group of the urea linkages, the urethane linkages, and combinations thereof. The composition also typically includes a plurality of soft segments. The soft segments comprise inorganic segments such as the silicone linkages in the silicone backbone. Those skilled in the art appreciate that the silicone resin and the polysiloxane include silicone linkages, i.e., Si—O bonds. The composition may include any ratio of the soft segments to the hard segments. In one embodiment, the composition includes a ratio of soft segments to hard segments that is at least 1.1:1. Without being bound or limited by any particular theory, it is believed that by preparing the composition to include a lower number of the hard segments relative to the soft segments, the composition has improved mechanical and thermal properties. It is believed that this is due in part to the hard segments typically being shorter and more rigid compared to the longer and more flexible soft segments. Those of ordinary skill in the art appreciate that the composition may be classified as a copolymer due to the hard and soft segments, and/or combination of the silicone resin, the polysiloxane, the isocyanate component, and optionally, the chain extender.

In one embodiment, the composition is moisture curable. In this embodiment, the composition comprises the further reaction product of a silane-containing moisture-cure component. The silane-containing moisture-cure component may be reacted with any one of or combination of the components to prepare the moisture curable composition. For example, the silane-containing moisture-cure component may be reacted with one of the isocyanate groups of the isocyanated intermediary or with one of the functional groups of one of the components. It is to be appreciated that the first and/or second component may include moisture curable moieties such that the composition is moisture curable without employing the silane-containing moisture-cure component.

The silane-containing moisture-cure component may be any silane-containing moisture-cure component known in the art. In one embodiment, the silane-containing moisture-cure component is selected from the group of an organosilane, an organopolysiloxane, and combinations thereof. In this embodiment, the organopolysiloxane can be selected from the group of, but is not limited to, a silanol terminated siloxane, an alkoxylsilyl-terminated siloxane, and combinations thereof. In another embodiment, the silane-containing moisture-cure component includes an alkoxysilane and more typically includes trimethoxysilane or triethoxysilane.

Specific examples of suitable silane-containing moisture-cure components include: 3-aminopropyltriethoxysiloxane, 3-aminopropyltrimethoxysiloxane, 3-isocyanatopropyltrimethoxysiloxane, 3-isocynatopropyltriethoxysiloxane, N-(2-aminoethyl)-3-aminopropyltrimethoxysiloxane, and combinations thereof.

If employed to prepare the composition, the silane-containing moisture-cure component may be present in the composition in any amount. Typically, the silane-containing moisture-cure component is present in an amount of from 0.1 to 30, more typically from 0.5 to 20, most typically from 0.5 to 5, parts by weight, based on 100 parts by weight of the composition.

In another embodiment, the composition is light curable. In this embodiment, the composition comprises the further reaction product of a light-cure component. The light-cure component may be reacted with any one of or combination of the components to prepare the light curable composition. For example, the light-cure component may be reacted with one of the isocyanate groups of the isocyanated intermediary or with one of the functional groups of one of the components. It is to be appreciated that the first and/or second component may include light curable moieties such that the composition is light curable without employing the light-cure component.

The light-cure component may be any light-cure component known in the art. In one embodiment, the light-cure component is selected from the group of acrylates, cinnamamides, and combinations thereof. The light-cure component typically includes a radical curable organosilicon group, which may include at least one of an acrylate group and a methacrylate group. Alternatively, the radical curable organosilicon group may include an acryloxyalkyl group such as an acryloxypropyl group, a methacryloxyalkyl group such as a methacryloxypropyl group, and/or an unsaturated organic group including, but not limited to, an alkenyl group having 2-12 carbon atoms including vinyl, allyl, butenyl, and hexenyl groups, alkynyl groups having 2-12 carbon atoms including ethynyl, propynyl, and butynyl groups, and combinations thereof. The unsaturated organic group may include the radical polymerizable group in oligomeric and/or polymeric polyethers including an allyloxypoly(oxyalkylene) group, halogen substituted analogs thereof, and combinations thereof.

If employed to prepare the composition, the light-cure component may be present in the composition in any amount. Typically, the light-cure component is present in an amount of from 0.1 to 20, more typically from 0.5 to 10, most typically from 0.5 to 5, parts by weight, based on 100 parts by weight of the composition.

The composition may further comprise a photoinitiator. The composition typically includes the photoinitiator if the light-cure component is employed to prepare the composition. The photoinitiator may be any photoinitiator known in art. The photoinitiator can be selected from the group of α-hydroxyketones, phenylglyoxylates, benzyldimethyl-ketals, α-aminoketones, mono-(acyl phosphines), bis-(acyl phosphines), phosphine oxides, metallocenes, iodonium salts, and combinations thereof.

If employed to prepare the composition, the photoinitiator may be present in the composition in any amount. Typically, the photoinitiator is present in an amount of from 0.05 to 20, more typically from 0.1 to 10, most typically from 0.5 to 5, parts by weight, based on 100 parts by weight of the composition.

The composition may further comprise a catalyst. In one embodiment, the composition includes the silane-containing moisture-cure component and the catalyst. In another embodiment, the composition includes the light-cure component and the catalyst. Typically, this embodiment with the light-cure component and the catalyst also includes the photoinitiator for initiating light curing of the composition. It is to be appreciated that the catalyst may be employed to prepare the composition in any of the embodiments of the present invention.

The catalyst may be any catalyst known in the art. The catalyst may comprise titanic acid esters such as tetrabutyl titanate, tetrapropyl titanate, partially chelated organotitanium and organozirconium compounds such as diisopropoxytitanium-di(ethylaceoacetonate) and di(n-propoxy)zirconium-di(ethylaceoacetonate), organotin compounds such as dibutyl tin dilaurate, dibutyl tin diacetate, and stannous octoate, organoaluminum compounds such as aluminum trisacetylacetonate, aluminum trisethylacetonate, diisopropoxyaluminum ethylacetonate, bismuth salts and organic carboxylic acids such as bismuth tris(2-ethylhexoate), bismuth tris(neodecanoate), chelate compounds such as zirconium tetracetylacetonate, titanium tetraacetylacetonate, organo lead compounds such as lead octylate, organovanadium compounds, amine compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl4-methylimidazole, 1,1-diazabicyclo(5,4,0)undecene-7 (DBU), and their salts with carboxylic acid, low-molecular-weight polyamide resins obtained from excess polyamines and poly basic acids, reaction products of excess polyamines and epoxy compounds, and combinations thereof.

Further, the catalyst may include an organometallic compound. The organometallic compound may include titanium, zirconium, tin, and combinations thereof. In one embodiment, the catalyst includes a tin compound. The tin compound may include dialkyltin (IV) salts of organic carboxylic acids such as dibutyltin diacetate, dimethyl tin dilaurate, dibutyltin dilaurate, dibutyltin maleate and dioctyltin diacetate, tin carboxylates, such as tin octylate or tin naphthenate, reaction products of dialkyltin oxides and phthalic acid esters or alkane diones, dialkyltin diacetyl acetonates such as dibutyltin diacetylacetonate (dibutyltin acetylacetonate), dialkyltinoxides such as dibutyltinoxide, tin (II) salts of organic carboxylic acids such as tin (II) diacetate, tin (II) dioctanoate, tin (II) diethylhexanoate or tin (II) dilaurate, dialkyl tin (IV) dihalides such as dimethyl tin dichloride, stannous salts of carboxylic acids such as stannous octoate, stannous oleate, stannous acetate, or stannous laurate, and combinations thereof. In another embodiment, the catalyst is selected from the group of dibutyltin diacetate, dibutyltin dilaurate, and combinations thereof. It is contemplated that a single catalyst may be used or a plurality of catalysts may be used. Typically, the catalyst includes dibutyltin diacetate and/or dibutyl tin dilaurate. In one embodiment, the catalyst includes dibutyltin diacetate.

If employed to prepare the composition, the catalyst may be present in the composition in any amount. Typically, the catalyst is present in an amount of from 0.1 to 20, more typically from 0.1 to 10, most typically from 0.1 to 5, parts by weight, based on 100 parts by weight of the composition.

The composition may further include an additive. The additive may comprise any additive known in the art. The additive may be reactive or may be inert. The additive may be selected from the group of an adhesion promoter, an extending polymer, a softening polymer, a reinforcing polymer, a toughening polymer, a viscosity modifier, a volatility modifier, an extending filler, a reinforcing filler, a conductive filler, a spacer, a dye, a pigment, a co-monomer, inorganic salts, organometallic complexes, a UV light absorber, a hindered amine light stabilizer, an aziridine stabilizer, a void reducing agent, a cure modifier, a free radical initiator, a diluent, a rheology modifier, an acid acceptor, an antioxidant, a heat stabilizer, a flame retardant, a silylating agent, a foam stabilizer, a gas generating agent, a surfactant, a wetting agent, a solvent, a plasticizer, a fluxing agent, a reactive chemical agent with functionality such as a carboxylic acid, aldehyde, or ketone, a desiccant, and combinations thereof. In one embodiment, the composition further includes at least one chemical additive that is reactive when exposed to certain biological agents.

Specific examples of suitable adhesion promoters, if employed as the additive, include: the alkoxyfunctional organosilanes, described above, such as (3-glycidylpropyl)trimethoxysiloxane, glycidoxymethyltrimethoxysilane, methacryloxypropyltrimethoxysilane, methacryloxymethyltrimethoxysilane, (acryloxypropyl)trimethoxysiloxane, acryloxymethyltrimethoxysilane, and organopolysiloxanes such as (methacryloxypropyl)methylsiloxane-dimethylsiloxane copolymer, methacryloxymethyl-terminated polydimethylsiloxane, methacryloxypropyl-terminated polydimethylsiloxane, (acryloxypropyl) methylsiloxane-dimethylsiloxane copolymer, and combinations thereof.

If employed to prepare the composition, the additive may be present in the composition in any amount. Typically, the additive is present in an amount of from 0.1 to 90, more typically from 0.1 to 50, most typically from 0.1 to 10, parts by weight, based on 100 parts by weight of the composition. In certain embodiments, the additive comprises the conductive filler. If employed, the conductive filler generally comprises a metal. Examples of suitable conductive fillers include, but are not limited to, silver, aluminum oxide, and combinations thereof. The conductive filler can be of various forms, such as a powder. If employed to prepare the composition, the conductive filler is typically present in an amount of from 50 to 90, more typically from 50 to 70, most typically from 60 to 70, parts by weight, based on 100 parts by weight of the composition.

For the method of preparing the composition, the first component is provided. The carbon-bonded functional group of the first component is reacted with the excess of the isocyanate component to form the isocyanated intermediary. The second component is reacted with at least one of the isocyanate functional groups of the isocyanated intermediary to prepare the silicone-containing composition. The composition may be prepared in any apparatus known in the art, and optionally, may be prepared in a plurality of apparatuses. For example, the composition can be prepared in a reaction vessel. In one embodiment, the composition is prepared under a nitrogen purge. The components may each be present in any amount to prepare the composition.

In one embodiment, at least one of the components is dissolved in an organic solvent. This embodiment may be useful if at least one of the components is solid or viscous. In addition, the organic solvent may also be useful for facilitating reaction between the components employed to prepare the composition. The organic solvent may be present in any amount. For example, after the composition is prepared, the composition can be present in an amount of from 10 to 50 parts by weight based on 100 parts by weight of the composition and the organic solvent combined. The organic solvent may be any organic solvent known in the art. The organic solvent can be selected from the group of tetrahydrofuran (THF), toluene, and combinations thereof. If the organic solvent is employed to prepare the composition, the organic solvent may be removed to obtain the composition after the composition is prepared. The organic solvent may be removed by any method known in the art, such as, but not limited to, evaporation via reduced pressure.

The composition may be prepared at any temperature. In certain embodiments, the excess of the isocyanate component is reacted with the first component and the second component is reacted with the isocyanated intermediary at a temperature of from 55° C. to 75° C. It is to be appreciated that the temperature may be held relatively constant or may be varied while preparing the composition. In other words, preparation of the composition can be conducted at various temperatures.

In one embodiment, an amount of the isocyanate component is analyzed to determine an extent of reaction between the isocyanate component and at least one of the components such as, but not limited to, the first component. By analyzing the extent of reaction, other components may be added at pre-determined extents of reaction of the isocyanate component to prepare the composition. For example, the extent of reaction can be analyzed to determine if the isocyanated intermediary has fully formed. The extent of reaction can be analyzed by any method known in the art. For example, the extent of reaction can be analyzed by IR spectroscopy.

In one embodiment, the chain extender is reacted with one of the isocyanate functional groups of the isocyanated intermediary or of the composition, if present with the composition, thereby forming at least one of the hard segments. In another embodiment, the silane-containing moisture-cure component is reacted with at least one of the isocyanate functional groups of the isocyanated intermediary or of the composition, if present with the composition, such that the composition is moisture curable. In other embodiments, the silane-containing moisture-cure component is reacted with other functional groups including, but not limited to, the carbon-bonded and/or the non-carbon bonded, functional groups, if present and unreacted. In another embodiment, the light-cure component is reacted with at least one of the isocyanate functional groups of the isocyanated intermediary or of the composition, if present with the composition, such that the composition is light curable. In other embodiments, the light-cure component may be reacted with other functional groups including, but not limited to, the carbon-bonded and/or the non-carbon bonded, functional groups, if present and unreacted. It is to be appreciated that any combination of the embodiments described herein may be employed to prepare the composition.

The following examples, illustrating the compositions and methods of the present invention, are intended to illustrate and not to limit the present invention.

EXAMPLES

Silicone Resins

Inventive examples of silicone resin including a plurality of carbon-bonded functional groups, more specifically, carbon-bonded amine groups, are prepared.

Silicone Resin 1:

To prepare a first example of the silicone resin, a mixture is reacted under nitrogen purge in a vessel. The vessel, used throughout various examples hereinafter, is a 1 liter (L) 3-neck round bottomed flask, which is equipped with a magnetic stir bar, a thermometer, a condenser, and a Dean-Stark trap.

The mixture includes:

118.98 grams of phenyltrimethoxysilane (PhSi(OMe)$_3$);

191.40 grams of phenylmethyldimethoxysilane (PhMeSi(OMe)$_2$);

38.26 grams of d-aminopropyltriethoxysilane (APTS; ((OEt)₂MeSi(PrNH₂))); and 174.85 grams of toluene.

The mixture is stirred and reacted at a temperature of 60° C. for 120 minutes. The mixture is hydrolyzed with 38.73 grams of deionized (DI) water. The mixture is then reacted with 26.61 grams of trimethylethoxysilane (EtOSiMe₃). Additional toluene and DI water is added, if required. The mixture is catalyzed with 4.89 grams of aqueous potassium hydroxide (KOH). After 120 minutes, the DI water is removed from the mixture via azeotrope distillation. The KOH in the mixture is neutralized with 5.01 grams of aqueous hydrochloric acid (HCl). The toluene is removed from the mixture via reduced pressure, leaving the first example of the silicone resin behind. The first example of the silicone resin is removed from the vessel, filtered, and rinsed to remove impurities, if present.

The first example of the silicone resin is of the general formula:

$$M_{0.075}D^{PhMe}_{0.525}D^{NH_2}_{0.10}T^{Ph}_{0.30}$$

wherein 0.075, 0.525, 0.10, and 0.30 are averages of each of the respective M, D, and T structural units per 1 unit of the silicone resin. The D and T structural units include the respective Me, NH₂, and Ph groups.

Silicone Resin 2:

To prepare a second example of the silicone resin, a second mixture is reacted under nitrogen purge in the vessel.

The second mixture includes:

46.12 grams of phenyltrimethoxysilane;
84.77 grams of phenylmethyldimethoxysilane;
14.83 grams of d-aminopropyltriethoxysilane; and
68.32 grams of toluene.

The second mixture is stirred and reacted at a temperature of 60° C. for 120 minutes. The second mixture is hydrolyzed with 32.16 grams of DI water. The second mixture is catalyzed with 1.90 grams of aqueous KOH. After 120 minutes, the DI water is removed from the first mixture via azeotrope distillation. The KOH in the second mixture is neutralized with 1.95 grams of aqueous HCl. The toluene is removed from the second mixture via reduced pressure, leaving the second example of the silicone resin behind. The second example of the silicone resin is removed from the vessel, filtered, and rinsed to remove impurities, if present.

The second example of the silicone resin is of the general formula:

$$D^{PhMe}_{0.60}D^{NH_2}_{0.10}T^{Ph}_{0.30}$$

wherein 0.60, 0.10, and 0.30 are averages of each of the respective D and T structural units per 1 unit of the silicone resin. The D and T structural units include the respective Me, NH₂, and Ph groups.

Compositions

A first component, an isocyanate component, a second component, and optionally, at least one of a chain extender, a silane-containing moisture-cure component, a light-cure component, a photoinitiator, a catalyst, and an organic solvent, are combined in a vessel to prepare the compositions of the present invention. The vessel, used throughout various examples hereinafter, is a 1 L 3-neck round bottomed flask, which is equipped with a magnetic stir bar, a thermometer, and a condenser.

Composition 1:

The composition is prepared under nitrogen purge in the vessel. The composition includes silicone and urea linkages. A first mixture, a second mixture, and a third mixture are prepared. The first mixture is 2.0 grams of hexamethylene diisocyanate (HDI) in 200 milliliters (mL) of dry tetrahydrofuran (THF). The second mixture is 12.0 grams of a silicone resin dissolved in THF. The silicone resin is Silicone Resin 1, as described above. The silicone resin is present in an amount of 12 parts by weight based on 100 parts by weight of the composition. The third mixture is 83.0 grams of a polysiloxane dissolved in THF. The polysiloxane is an aminopropyl terminated polydimethylsiloxane, commercially available as DMS-A15 from Gelest, Inc. of Morrisville, Pa. The polysiloxane is present in an amount of 86 parts by weight based on 100 parts by weight of the composition. The first and second mixtures are introduced to the vessel. The mixtures are stirred and reacted at a temperature of 65° C. for 15 minutes to form an isocyanated intermediary. The third mixture is then introduced to the vessel and stirred and reacted with the isocyanated intermediary at a temperature of 65° C. for 120 minutes to form the composition. The THF is removed from the vessel via reduced pressure, leaving the composition behind. The composition is placed on a release liner in an oven to remove any remaining THF, if present.

Mechanical characteristics of the composition are tested by dynamic mechanical analysis (DMA). The mechanical characteristics tested include storage modulus (G'), loss modulus (G"), and tan delta (δ), each versus a change in temperature of the composition. A glass transition temperature (Tg) range and elastomer melting point of the composition is also determined. Morphology characteristics of the composition are examined by atomic force microscopy (AFM). The morphology characteristics include phase separation characteristics of the composition.

Compositions 2-14:

Thirteen additional inventive examples of the composition, Compositions 2 through 14, are prepared as described below. The compositions include silicone and urea linkages. The amount and type of each component used to form the compositions are indicated in Table I below with all values in approximate parts by weight based on 100 parts by weight of the composition unless otherwise indicated.

TABLE I

| Composition No. | First Component | Isocyanate Component | Second Component |
|---|---|---|---|
| 2 | 10.34 | 6.85 | 82.80 |
| 3 | 10.81 | 8.11 | 75.68 |
| 4 | 10.93 | 8.20 | 76.50 |
| 5 | 20.83 | 6.25 | 72.92 |
| 6 | 25.03 | 4.89 | 70.08 |
| 7 | 28.30 | 5.66 | 66.04 |
| 8 | 5.00 | 6.80 | 86.00 |
| 9 | 10.46 | 5.83 | 83.70 |
| 10 | 25.22 | 4.14 | 70.63 |
| 11 | 40.29 | 3.31 | 56.50 |
| 12 | 20.19 | 4.42 | 75.63 |
| 13 | 25.22 | 4.15 | 70.63 |
| 14 | 10.00 | 6.80 | 93.00 |

In compositions 2 through 14, the first component is a mixture of a silicone resin in THF. The silicone resin is Silicone Resin 2. The silicone resin is present in an amount of 5 to 40 parts by weight based on 100 parts by weight of the composition. In compositions 2 through 7, the isocyanate component is HDI. In compositions 8 through 14, the isocyanate component is isophorone diisocyanate (IPDI). In compositions 2 through 14, the second component is a mixture of a polysiloxane in THF. The polysiloxane is the aminopropyl terminated polydimethylsiloxane. The polysiloxane is present in an amount of 56.5 to 93 parts by weight based on 100 parts by weight of the composition.

Figure 2:
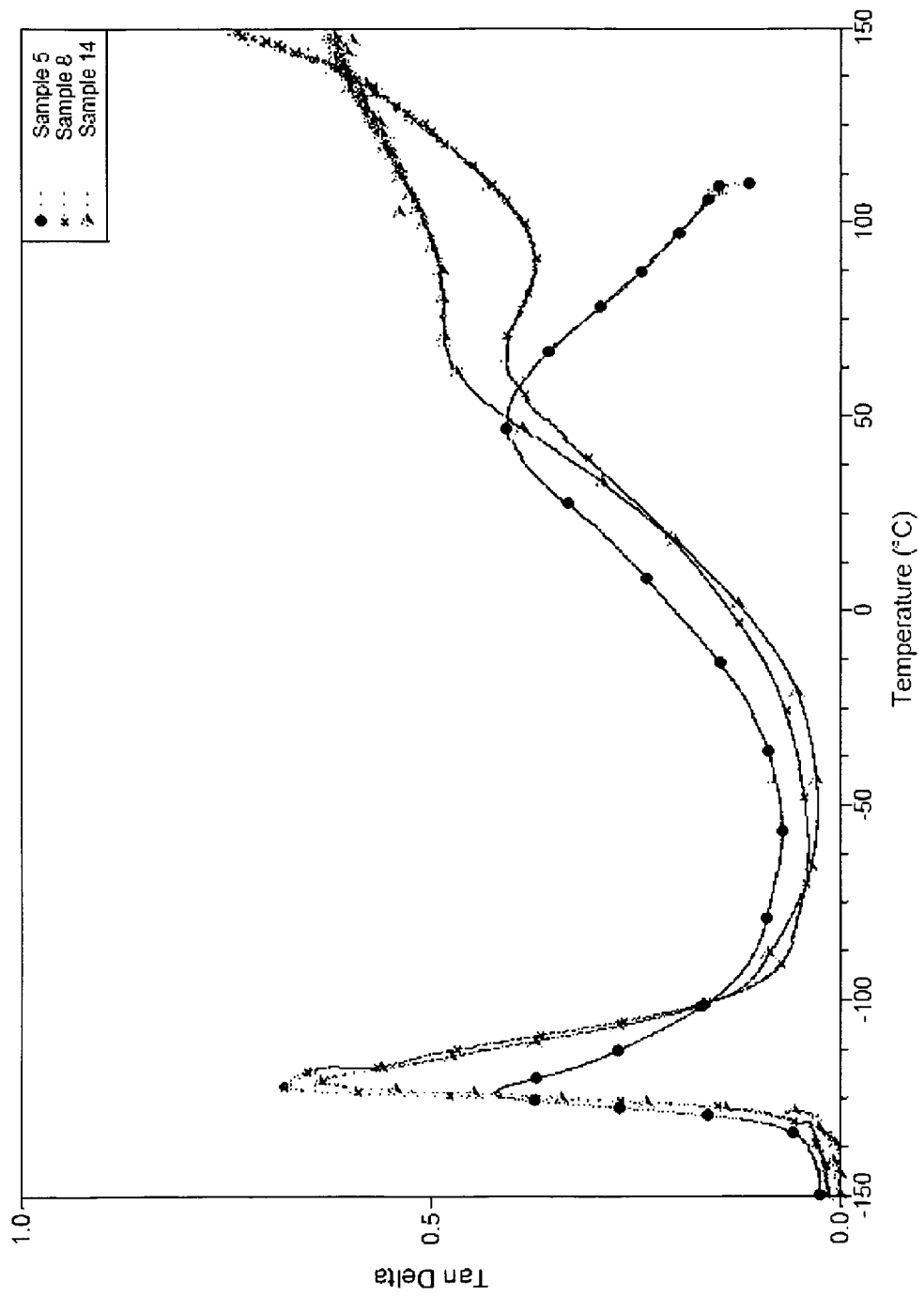
FIG. 2 is a line graph illustrating tan delta (δ) as a function of a change in temperature of examples 5, 8, and 14 of the inventive compositions.

Each of the compositions is individually prepared under nitrogen purge in the vessel. The first component and the isocyanate component are introduced to the vessel. The components are stirred and reacted at a temperature of 65° C. for 15 minutes to form the isocyanated intermediary. The second component is then introduced to the vessel and stirred and reacted with the isocyanated intermediary at a temperature of 65° C. for 120 minutes to form the composition. The THF is removed from the vessel via reduced pressure, leaving the composition behind. The composition is placed on a release liner in an oven to remove any remaining THF, if present. Mechanical characteristics of the compositions are tested by DMA. Morphology characteristics of the compositions are examined by AFM. Referring now to FIG. 1, G' versus a change in temperature in degrees Celsius of the composition, i.e., example, numbers 5, 8, and 14 can be better appreciated. In FIG. 2, tan δ versus a change in temperature in degrees Celsius of the composition numbers 5, 8, and 14 can also be better appreciated. As shown in the Figures, mechanical characteristics of the compositions vary depending on the amount of the first component employed to prepare the compositions.

Composition 15:

The composition is prepared under nitrogen purge in the vessel. The composition is light curable and includes silicone and urea linkages. A first mixture, a second mixture, and a third mixture are prepared. The first mixture is 2.0 grams of HDI in 200 mL of dry THF. The second mixture is 12.0 grams of a silicone resin dissolved in THF. The silicone resin is Silicone Resin 2, as described above. The silicone resin is present in an amount of 12 parts by weight based on 100 parts by weight of the composition. The third mixture is 83.0 grams of a polysiloxane dissolved in THF. The polysiloxane is the aminopropyl terminated polydimethylsiloxane. The polysiloxane is present in an amount of 86 parts by weight based on 100 parts by weight of the composition. The first and second mixtures are introduced to the vessel. The mixtures are stirred and reacted at a temperature of 65° C. for 15 minutes to form the isocyanated intermediary. The third mixture is then introduced to the vessel and stirred and reacted with the isocyanated intermediary at a temperature of 65° C. for 120 minutes to form a reaction mixture. An excess of the HDI is monitored via IR spectroscopy to determine the extent of reaction of the reaction mixture. The vessel and the reaction mixture are cooled to room temperature (~25° C.). Next, 0.8 grams of a light-cure component, more specifically, 2-hydroxyethylmethacrylate, is added to the vessel and reacted with the reaction mixture. The reaction mixture is catalyzed with 0.05 grams of a catalyst, more specifically, dibutyltin dilaurate. The reaction mixture is mixed at room temperature for 180 minutes. The THF is removed from the vessel via reduced pressure, leaving a light curable composition behind. The light curable composition is placed on a release liner in an oven at a temperature of 60° C. to remove any remaining THF, if present. Mechanical characteristics of the light curable composition are tested by DMA. Morphology characteristics of the light curable composition are examined by AFM.

Composition 16:

The composition is prepared under nitrogen purge in the vessel. The composition is moisture curable and includes silicone and urea linkages. A first mixture and a second mixture are prepared. The first mixture is 1.55 grams of HDI in 200 mL of dry THF. The second mixture is 14.0 grams of a polysiloxane and 2.0 grams of a silicone resin. The polysiloxane includes terminal amine groups and has a molecular weight of about 3000. The silicone resin includes amine groups. The first and second mixtures are introduced to the vessel. The mixtures are stirred and reacted at a temperature of 60° C. for 120 minutes to form a reaction mixture. The vessel and the reaction mixture are cooled to room temperature. Next, 0.5 grams of a silane-containing moisture-cure component, more specifically, 3-aminopropyltrimethoxysilane, is added to the vessel. The reaction mixture is catalyzed with 0.05 grams of dibutyltin dilaurate. The reaction mixture is mixed at room temperature for 180 minutes. The THF is removed from the vessel via reduced pressure, leaving a moisture curable composition behind. Mechanical characteristics of the moisture curable composition are tested by DMA. Morphology characteristics of the moisture curable composition are examined by AFM.

Composition 17:

The composition is prepared under nitrogen purge in the vessel. The composition is light curable and includes silicone and urea linkages. A first mixture is prepared. The first mixture is 1.6 grams of HDI in 200 mL of dry THF. The first mixture and 16.0 grams of a polysiloxane is added to the vessel and reacted at a temperature of 70° C. for 120 minutes to form an isocyanated intermediary. The polysiloxane is the aminopropyl terminated polydimethylsiloxane. The vessel and the isocyanated intermediary are cooled to room temperature. Next, 0.3 grams of a light-cure component, more specifically, 2-hydroxymethylmethacrylate, is added to the vessel and reacted with the isocyanated intermediary to form a reaction mixture. The reaction mixture is catalyzed with 0.05 grams of dibutyltin dilaurate. The reaction mixture is mixed at room temperature for 240 minutes. An excess of the HDI is monitored via IR spectroscopy to determine the extent of reaction of the reaction mixture. The THF is removed from the vessel via reduced pressure, leaving a light curable composition behind.

Next, 5.0 grams of the light curable composition is dissolved in 17 mL of THF along with 0.01 grams of a photoinitiator to form a solution. The photoinitiator is Darocur 1173, commercially available from Ciba Specialty Chemicals, Inc. of Tarrytown, N.Y. The solution is cast on a release liner and placed in an oven at a temperature of 60° C. to evaporate the THF, thereby forming a film of the light curable composition. The film is exposed to UV light, at 256 nanometers in wavelength, to cure the film. Mechanical characteristics of the film are tested by DMA. Morphology characteristics of the film are examined by AFM.

Compositions 18-20:

Three additional inventive examples of the composition, Compositions 18 through 20, are prepared according to the present invention. The compositions include silicone and urea linkages and are curable, more specifically, are moisture or light curable. The amount and type of each component used to form the compositions are indicated in Table II below with all values in approximate parts by weight based on 100 parts by weight of the composition unless otherwise indicated.

TABLE II

| Composition No. | First Component | Isocyanate Component | Second Component | Cure Component |
| --- | --- | --- | --- | --- |
| 18 | 10.81 | 8.11 | 75.68 | 5.41 |
| 19 | 11.08 | 8.59 | 77.56 | 2.77 |
| 20 | 10.93 | 8.20 | 76.50 | 4.37 |

The first component is a mixture of a silicone resin in THF. The silicone resin is Silicone Resin 2, as described above. The silicone resin is present in an amount of about 11 parts by weight based on 100 parts by weight of the composition. The isocyanate component is HDI. The second component is a mixture of a polysiloxane in THF. The polysiloxane is the aminopropyl terminated polydimethylsiloxane, as described above. The polysiloxane is present in an amount of about 76 parts by weight based on 100 parts by weight of the mixture. In composition 18, the cure component is a silane-containing moisture-cure component, more specifically, 3-aminopropyltrimethoxysilane (APTS). In compositions 19 and 20, the cure components are light-cure components, more specifically, a cinnamate and a methacrylate, respectively.

Each of the compositions is individually prepared under nitrogen purge in the vessel. The first component and the isocyanate component are introduced to the vessel. The components are stirred and reacted at a temperature of 65° C. for 15 minutes to form the isocyanated intermediary. The second component is then introduced to the vessel and stirred and reacted with the isocyanated intermediary at a temperature of 65° C. for 120 minutes to form a reaction mixture. The vessel and the reaction mixture are cooled to room temperature. The cure component is added to the vessel and reacted with the reaction mixture to form the composition. The reaction mixture is catalyzed with 0.05 grams of dibutyltin dilaurate. The reaction mixture is mixed at room temperature for 240 minutes. An excess of the HDI is monitored via IR spectroscopy until gone, i.e., fully reacted. The THF is removed from the vessel via reduced pressure, leaving the curable composition behind. The THF is removed from the vessel via reduced pressure, leaving the curable composition behind.

Composition 21:

An inventive example of the composition including silicone, urethane, and urea linkages is prepared under nitrogen purge in the vessel. A first mixture, a second mixture, and a third mixture are prepared. The first mixture is 1.4 grams of HDI in 200 mL of dry THF. The second mixture is 4.0 grams of a silicone resin dissolved in THF. The silicone resin is Silicone Resin 2, as described above. The silicone resin is present in an amount of 17 parts by weight based on 100 parts by weight of the composition. The third mixture is 14 grams of a polysiloxane dissolved in THF. The third mixture further includes 4.0 grams of a polyol, more specifically, 1,4-butanediol. The polysiloxane is the aminopropyl terminated polydimethylsiloxane. The polysiloxane is present in an amount of 56 parts by weight and the polyol is present in an amount of 17 parts by weight, each based on 100 parts by weight of the composition. The first and second mixtures are introduced to the vessel. The mixtures are stirred and reacted at a temperature of 65° C. for 15 minutes to form an isocyanated intermediary. The third mixture is then introduced to the vessel and stirred and reacted with the isocyanated intermediary at a temperature of 65° C. for 120 minutes to form the composition. The THF is removed from the vessel via reduced pressure, leaving the composition behind. The composition is placed on a release liner in an oven at a temperature of 60° C. to remove any remaining THF, if present. Mechanical characteristics of the film are tested by DMA. Morphology characteristics of the film are examined by AFM.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A silicone-containing composition comprising the reaction product of:
   I) an isocyanated intermediary having a plurality of isocyanate functional groups and comprising the reaction product of:
      i) a first component that is either a polysiloxane or a silicone resin having a carbon-bonded functional group selected from one of a hydroxyl group and an amine group, and
      ii) an excess of an isocyanate component that is reactive with said carbon-bonded functional group of said first component thereby forming said isocyanated intermediary; and
   II) a second component selected from the other of said polysiloxane or said silicone resin having a plurality of carbon-bonded functional groups reactive with said isocyanate functional groups of said isocyanated intermediary for preparing said silicone-containing composition.

2. A silicone-containing composition as set forth in claim 1 wherein said carbon-bonded functional groups of said second component are selected from the group of hydroxyl groups, amine groups, and combinations thereof.

3. A silicone-containing composition as set forth in claim 1 wherein said silicone resin is of the formula $(M)_a(D)_b(T)_c(Q)_d$ and subscript a is from 0 to 0.6, subscript b is from 0.1 to 0.9, subscript c is from 0.1 to 0.8, and subscript d is from 0 to 0.5.

4. A silicone-containing composition as set forth in claim 3 wherein said silicone resin further comprises at least one of an alkyl group, an aryl group, an alkenyl group, and an alkynyl group.

5. A silicone-containing composition as set forth in claim 1 wherein said polysiloxane is a polydimethylsiloxane.

6. A silicone-containing composition as set forth in claim 1 wherein said isocyanate component is of the formula OCN—R—NCO and R is selected from one of an alkyl moiety, an aryl moiety, and an arylalkyl moiety.

7. A silicone-containing composition as set forth in claim 1 wherein said isocyanate component is selected from the group of diphenylmethane diisocyanates (MDI), polymeric diphenylmethane diisocyanates (pMDI), toluene diisocyanates (TDI), hexamethylene diisocyanates (HDI), dicyclohexylmethane diisocyanates (HMDI), isophorone diisocyanates (IPDI), cyclohexyl diisocyanates (CHDI), and combinations thereof.

8. A silicone-containing composition as set forth in claim 1 wherein the reaction product of said silicone-containing composition is moisture curable and is further derived from a silane-containing moisture-cure component reactive with at least one of said isocyanate groups of said isocyanated intermediary and/or at with least one of said functional groups of one of said components for preparing said silicone-containing composition.

9. A silicone-containing composition as set forth in claim 1 wherein the reaction product of said silicone-containing composition is light curable and is further derived from a light-cure component selected from the group of acrylates, cinnamamides, and combinations thereof reactive with at least one of said isocyanate groups of said isocyanated intermediary and/or with at least one of said functional groups of one of said components for preparing said silicone-containing composition.

10. A silicone-containing composition as set forth in claim 1 wherein the reaction product of said silicone-containing composition is further derived from a chain extender reactive with at least one of said functional groups of one of said components and with at least one of said isocyanate groups of said isocyanate component or said isocyanated intermediary thereby forming a hard segment of said silicone-containing composition.

11. A silicone-containing composition as set forth in claim 1 further comprising hard segments defined as at least one of urea linkages and urethane linkages and further comprising soft segments defined as silicone linkages wherein a ratio of said soft segments to said hard segments is at least 1.1:1.

12. A silicone-containing composition as set forth in claim 1 wherein at least one of said carbon-bonded functional groups of said components and said isocyanate functional groups is unreacted.

13. A silicone-containing composition as set forth in claim 1 wherein said first component is said silicone resin and said second component is said polysiloxane.

14. A silicone-containing composition as set forth in claim 3 wherein said silicone resin comprises at least one of said D structural units including an aryl group and an alkyl group and at least another of said D structural units including at least one of an amine group and at least one of said T structural units including an aryl group.

15. A silicone-containing composition as set forth in claim 1 wherein said first component is said polysiloxane and said second component is said silicone resin.

16. An article formed from said silicone-containing composition as set forth in claim 1.

17. A silicone-containing composition as set forth in claim 1 further comprising an additive, wherein said additive comprises a conductive filler.

18. A method of preparing a silicone-containing composition comprising the steps of:
    (A) providing a first component selected from one of a polysiloxane and a silicone resin and having a carbon-bonded functional group selected from one of a hydroxyl group and an amine group;
    (B) reacting an excess of an isocyanate component relative to the first component with the carbon-bonded functional group of the first component thereby forming an isocyanated intermediary having a plurality of isocyanate functional groups; and
    (C) reacting a second component having a plurality of carbon-bonded functional groups and selected from the other of the polysiloxane and the silicone resin with at least one of the isocyanate functional groups of the isocyanated intermediary.

19. A method as set forth in claim 18 wherein the carbon-bonded functional groups of the second component are selected from the group of hydroxyl groups, amine groups, and combinations thereof.

20. A method as set forth in claim 19 wherein the silicone resin is of the formula $(M)_a(D)_b(T)_c(Q)_d$ and subscript a is from 0 to 0.6, subscript b is from 0.1 to 0.9, subscript c is from 0.1 to 0.8, and subscript d is from 0 to 0.5.

21. A method as set forth in claim 20 wherein the silicone resin further comprises at least one of an alkyl group, an aryl group, an alkenyl group, and an alkynyl group.

22. A method as set forth in claim 18 wherein the polysiloxane is a polydimethylsiloxane.

23. A method as set forth in claim 19 further comprising the step of reacting a chain extender with one of the isocyanate functional groups of the isocyanated intermediary thereby forming a hard segment.

24. A method as set forth in claim 19 further comprising the step of reacting a silane-containing moisture-cure component with at least one of the isocyanate functional groups such that said silicone-containing composition is moisture curable.

25. A method as set forth in claim 19 further comprising the step of reacting a light-cure component selected from the group of acrylates, cinnamamides and combinations thereof with at least one of the isocyanate functional groups such that said silicone-containing composition is light curable.

26. A method as set forth in claim 19 further comprising the step of dissolving at least one of the components in an organic solvent.

27. A method as set forth in claim 26 further comprising the step of removing the organic solvent after the step of reacting the second component to obtain the silicone-containing composition.

28. A method as set forth in claim 19 wherein the steps of reacting the excess of the isocyanate component and reacting the second component are conducted at a temperature of from 55° C. to 75° C.

29. A method as set forth in claim 19 further comprising the step of analyzing an amount of the isocyanate component to determine an extent of reaction between the isocyanate component and at least one of the components.

* * * * *